United States Patent
Boyce et al.

(10) Patent No.: US 9,313,486 B2
(45) Date of Patent: Apr. 12, 2016

(54) HYBRID VIDEO CODING TECHNIQUES

(71) Applicant: Vidyo, Inc., Hackensack, NJ (US)

(72) Inventors: Jill Boyce, Manalapan, NJ (US);
Stephan Wenger, Hillsborough, CA (US); Danny Hong, New York, NY (US)

(73) Assignee: VIDYO, INC., Hackensack, NJ (US)

( * ) Notice: Subject to any disclaimer, the term of this patent is extended or adjusted under 35 U.S.C. 154(b) by 398 days.

(21) Appl. No.: 14/026,813

(22) Filed: Sep. 13, 2013

(65) Prior Publication Data

US 2014/0016694 A1 Jan. 16, 2014

Related U.S. Application Data

(63) Continuation-in-part of application No. 13/528,010, filed on Jun. 20, 2012, now abandoned, and a continuation-in-part of application No. 13/539,900, filed on Jul. 2, 2012, now Pat. No. 8,938,004.

(60) Provisional application No. 61/708,341, filed on Oct. 1, 2012.

(51) Int. Cl.
*H04N 7/12* (2006.01)
*H04N 11/02* (2006.01)
(Continued)

(52) U.S. Cl.
CPC ......... *H04N 19/00321* (2013.01); *H04N 19/12* (2014.11); *H04N 19/187* (2014.11); *H04N 19/30* (2014.11); *H04N 19/61* (2014.11); *H04N 19/70* (2014.11)

(58) Field of Classification Search
None
See application file for complete search history.

(56) References Cited

U.S. PATENT DOCUMENTS

| 4,958,226 A | 9/1990 | Haskell et al. |
| 5,136,377 A | 8/1992 | Johnston et al. |

(Continued)

FOREIGN PATENT DOCUMENTS

| EP | 1 445 958 | 8/2004 |
| JP | H09-116903 | 5/1997 |

(Continued)

OTHER PUBLICATIONS

U.S. Appl. No. 11/491,057 (Abandoned), filed Jul. 20, 2006.
(Continued)

*Primary Examiner* — Joseph Ustaris
*Assistant Examiner* — Talha Nawaz
(74) *Attorney, Agent, or Firm* — Baker Botts L.L.P.

(57) ABSTRACT

Disclosed are techniques for encoding and decoding layered video where the non-temporal enhancement layers and their respective temporal enhancement layers, comply with a scalable video coding standard or technology, and the base layer and its respective temporal enhancement layers does not comply with the same scalable video coding standard or technology. A Video Parameter Set that comprises information about the relationship of layers includes a syntax element indicative of the derivation mechanism for a temporal layer associated with a NAL unit coded in a first coding technology, for example HEVC. For one value of the syntax element, the derivation mechanism is to set the temporal layer of the base layer NAL unit to the value coded in the header of the encapsulating NAL unit, which can be an HEVC NAL unit. For another value, the derivation mechanism is to imply the value of temporal base layer for the first NAL unit.

13 Claims, 6 Drawing Sheets

(51) Int. Cl.

| | | |
|---|---|---|
| H04N 11/04 | (2006.01) | |
| H04N 19/187 | (2014.01) | |
| H04N 19/70 | (2014.01) | |
| H04N 19/30 | (2014.01) | |
| H04N 19/61 | (2014.01) | |
| H04N 19/12 | (2014.01) | |

(56) References Cited

U.S. PATENT DOCUMENTS

| | | | |
|---|---|---|---|
| 5,227,878 | A | 7/1993 | Puri et al. |
| 5,500,678 | A | 3/1996 | Puri |
| 5,563,593 | A | 10/1996 | Puri |
| 6,014,694 | A | 1/2000 | Aharoni et al. |
| 6,085,252 | A | 7/2000 | Zhu et al. |
| 6,097,697 | A | 8/2000 | Yao et al. |
| 6,157,396 | A * | 12/2000 | Margulis ............... G06T 1/20 345/506 |
| 6,456,340 | B1 * | 9/2002 | Margulis ............... G06T 1/20 345/501 |
| 6,496,217 | B1 | 12/2002 | Piotrowski |
| 6,643,496 | B1 | 11/2003 | Shimoyama et al. |
| 7,012,893 | B2 | 3/2006 | Bahadiroglu |
| 7,062,096 | B2 * | 6/2006 | Lin ..................... H04N 19/587 358/426.13 |
| 7,295,520 | B2 | 11/2007 | Lee et al. |
| 7,342,880 | B2 | 3/2008 | Yanagihara et al. |
| 7,542,435 | B2 | 6/2009 | Leon et al. |
| 7,593,032 | B2 | 9/2009 | Civanlar et al. |
| 7,593,339 | B2 | 9/2009 | Shoemake et al. |
| 7,701,851 | B2 | 4/2010 | Chakareski et al. |
| 7,817,625 | B2 | 10/2010 | Jefremov |
| 7,839,929 | B2 * | 11/2010 | Han ..................... H04N 19/70 375/240.08 |
| 7,933,294 | B2 | 4/2011 | Chakareski et al. |
| 7,948,886 | B2 | 5/2011 | Chakareski et al. |
| 8,126,054 | B2 | 2/2012 | Hsiang |
| 8,289,370 | B2 | 10/2012 | Civanlar et al. |
| 8,649,441 | B2 | 2/2014 | Hong et al. |
| 8,699,522 | B2 | 4/2014 | Chakareski et al. |
| 2002/0136162 | A1 | 9/2002 | Yoshimura et al. |
| 2003/0086622 | A1 | 5/2003 | Klein Gunnewick et al. |
| 2004/0086041 | A1 | 5/2004 | Ye et al. |
| 2004/0114817 | A1 | 6/2004 | Jayant et al. |
| 2004/0170395 | A1 | 9/2004 | Filippini et al. |
| 2004/0252758 | A1 | 12/2004 | Katsavounidis et al. |
| 2004/0252900 | A1 | 12/2004 | Bruls |
| 2005/0058065 | A1 | 3/2005 | Tiller et al. |
| 2005/0163211 | A1 | 7/2005 | Shanableh |
| 2006/0023748 | A1 | 2/2006 | Chandhok et al. |
| 2006/0224763 | A1 | 10/2006 | Altunbasak et al. |
| 2007/0005804 | A1 | 1/2007 | Rideout |
| 2007/0086515 | A1 | 4/2007 | Kirkenko et al. |
| 2007/0086521 | A1 | 4/2007 | Wang et al. |
| 2007/0110150 | A1 | 5/2007 | Wang et al. |
| 2007/0133405 | A1 | 6/2007 | Bowra et al. |
| 2008/0007438 | A1 | 1/2008 | Segall et al. |
| 2008/0089411 | A1 | 4/2008 | Wenger et al. |
| 2008/0089428 | A1 | 4/2008 | Nakamura et al. |
| 2008/0137753 | A1 | 6/2008 | He |
| 2009/0116562 | A1 | 5/2009 | Eleftheriadis et al. |
| 2009/0252220 | A1 | 10/2009 | Choi et al. |
| 2010/0020871 | A1 | 1/2010 | Hannuksela et al. |
| 2010/0067581 | A1 | 3/2010 | Hong et al. |
| 2010/0098157 | A1 | 4/2010 | Yang |
| 2010/0150232 | A1 | 6/2010 | Nguyen et al. |
| 2010/0158116 | A1 | 6/2010 | Jeon et al. |
| 2010/0172409 | A1 | 7/2010 | Reznik et al. |
| 2010/0189182 | A1 | 7/2010 | Hannuksela et al. |
| 2010/0195738 | A1 | 8/2010 | Zhu et al. |
| 2011/0013701 | A1 | 1/2011 | Henocq et al. |
| 2011/0134994 | A1 | 6/2011 | Lu et al. |
| 2011/0182353 | A1 | 7/2011 | Bae |
| 2012/0050475 | A1 | 3/2012 | Tian et al. |
| 2012/0075436 | A1 | 3/2012 | Chen et al. |
| 2012/0183077 | A1 | 7/2012 | Hong et al. |
| 2012/0230431 | A1 | 9/2012 | Boyce et al. |
| 2012/0269275 | A1 | 10/2012 | Hannuksela et al. |
| 2012/0275517 | A1 | 11/2012 | Boyce et al. |
| 2013/0016776 | A1 | 1/2013 | Boyce et al. |
| 2013/0034170 | A1 * | 2/2013 | Chen ..................... H04N 13/00 375/240.25 |
| 2013/0201279 | A1 | 8/2013 | Civanlar et al. |
| 2014/0092964 | A1 * | 4/2014 | Ugur ..................... H04N 19/46 375/240.12 |
| 2014/0092978 | A1 * | 4/2014 | Bugdayci ............ H04N 19/513 375/240.16 |
| 2014/0293180 | A1 * | 10/2014 | Hong ................... G09G 3/3655 349/34 |

FOREIGN PATENT DOCUMENTS

| | | |
|---|---|---|
| JP | 2000-295608 | 10/2000 |
| JP | 2005-167962 | 6/2005 |
| WO | WO 03/063505 | 7/2003 |
| WO | WO 2004/036916 | 4/2004 |
| WO | WO 2004/040917 | 5/2004 |
| WO | WO 2004/043071 | 5/2004 |
| WO | WO 2004/098196 | 11/2004 |
| WO | WO 2005/048600 | 5/2005 |
| WO | WO 2006/108917 | 10/2006 |
| WO | WO 2007/112384 | 10/2007 |
| WO | WO 2008/007792 | 1/2008 |
| WO | WO 2008/008133 | 1/2008 |
| WO | WO 2008/030068 | 3/2008 |
| WO | WO 2008/047929 | 5/2008 |
| WO | WO 2008/051380 | 5/2008 |
| WO | WO 2008/130500 | 10/2008 |
| WO | WO 2010/126608 A2 | 11/2010 |
| WO | WO 2010/126613 | 11/2010 |

OTHER PUBLICATIONS

U.S. Appl. No. 12/715,845, filed Apr. 18, 2011 Issue Fee payment.
U.S. Appl. No. 12/715,845, filed Jan. 18, 2011 Notice of Allowance.
U.S. Appl. No. 12/715,845, filed Dec. 7, 2010 Terminal Disclaimer filed.
U.S. Appl. No. 11/953,398, filed Mar. 21, 2011 Issue Fee payment.
U.S. Appl. No. 11/953,398, filed Dec. 21, 2010 Notice of Allowance.
U.S. Appl. No. 11/953,398, filed Nov. 21, 2010 Advisory Action.
U.S. Appl. No. 11/953,398, filed Nov. 23, 2010 Response to Final Office Action.
U.S. Appl. No. 11/953,398, filed Oct. 22, 2010 Response to Final Office Action.
U.S. Appl. No. 11/953,398, filed Jul. 23, 2010 Final Office Action.
U.S. Appl. No. 11/953,398, filed Apr. 20, 2010 Response to Non-Final Office Action.
U.S. Appl. No. 11/953,398, filed Oct. 20, 2009 Non-Final Office Action.
U.S. Appl. No. 13/052,741, filed Dec. 26, 2013 Issue Fee payment.
U.S. Appl. No. 13/052,741, filed Sep. 4, 2013 Terminal Disclaimer Review Decision.
U.S. Appl. No. 13/052,741, filed Aug. 30, 2013 Response to Non-Final Office Action and Terminal Disclaimer filed.
U.S. Appl. No. 13/052,741, filed Mar. 1, 2013 Non-Final Office Action.
U.S. Appl. No. 11/933,865, filed Mar. 2, 2010 Issue Fee payment.
U.S. Appl. No. 11/933,865, filed Dec. 2, 2009 Notice of Allowance.
U.S. Appl. No. 11/933,865, filed Nov. 11, 2009 Response to Non-Final Office Action.
U.S. Appl. No. 11/933,865, filed May 11, 2009 Non-Final Office Action.
U.S. Appl. No. 12/015,956, filed Sep. 10, 2012 Issue Fee payment.
U.S. Appl. No. 12/015,956, filed Aug. 27, 2012 Response to Amendment under Rule 312.
U.S. Appl. No. 12/015,956, filed Aug. 8, 2012 Amendment after notice of allowance.
U.S. Appl. No. 12/015,956, filed Jun. 8, 2012 Notice of Allowance.
U.S. Appl. No. 12/015,956, filed Apr. 19, 2012 Response to Non-Final Office Action.

(56) References Cited

OTHER PUBLICATIONS

U.S. Appl. No. 12/015,956, filed Oct. 19, 2011 Non-Final Office Action.
International Search Report and Written Opinion for PCT/US2012/043251, dated Sep. 18, 2012 (Corresponds to U.S. Appl. No. 13/528,010).
International Search Report and Written Opinion for PCT/US2013/059730, dated Jan. 3, 2014.
International Search Report and Written Opinion—PCT/US06/028365 (International Filing Date: Jul. 21, 2006).
International Search Report and Written Opinion for PCT/US2012/028032, dated May 30, 2012.
International Search Report and Written Opinion for PCT/US2012/020809, dated Mar. 21, 2012.
European Extended Search Report for EP 06788106, dated Oct. 18, 2012 (Corresponds to U.S. Appl. No. 13/621,714).
Blake, et al., "RFC 2475: An Architecture for Differentiated Services", Internet Citation, Dec. 1998, XP002220520; Retrieved from the Internet: URL:ftp.//ftp.isi.edu/in-notes/rfc2475.txt [retrieved on Nov. 11, 2002].
"H.263+(or H.263 version 2), Video Coding for Low Bitrate Communication", Sep. 2, 1998, No. H.263, Version 2, Feb. 9, 1998, XP030001506.
Eleftheriadis, et al., "Multipoint videoconferencing with scalable video coding", Journal of Zhejiang University Science A; An International Applied Physics & Engineering Journal, Springer, Berlin, DE, 7(5):696-705 (May 1, 2006), XP019385029.
Jia, Jie "error Resilience for SVC base and enhanced layers" *Joint Video Team (JVT) of ISO/IEC MPEG & ITU-T VCEG, 15ht Meeting*: Busan, KR, Apr. 16-22, 2005 (JVT-0048) (23 pages).
Jinzenji, et al., "Scalable Video Conference System Using MPEG-4 ASP/FGS Software CODECs", *Japan, The Institute of Electronics, Information and Communication Engineers*, 104(752):55-60 (2005) (English Abstract only).
Kirenko, et al., "Flexible Scalable Video Compression", 69. MPEG Meeting; Jul. 19, 2004-Jul. 23, 2004; Redmond; (Motion Picture Expert Group of ISO/IEC JTC1/SC29/WG11), No. M10997, Jul. 14, 2004, XP030039776.
Reichel, et al., "Joint Scalable Video Model (JSVM) 3.0 Reference Encoding Algorith Description", 73. MPEG Meeting; Jul. 25, 2005-Jul. 29, 2005; Poznan, Poland; (Motion Picture Expert Group or ISO/TEC JTC1/SC29/WG11), No. N7311, Sep. 6, 2005, XP030013911.
S. Wenger, "Video Redundancy Coding in H.263+", Workshop on Audio-Visual Services for Packet Networks (aka Packet Video Workshop), 1997, 6 pages.
Wiegand, et al., "Overview of the H.264/AVC/ Video Coding Standard", *IEEE Transactions of Circuits and Systems for Video Technology*, 13(7):560-576 (2003).
Wang, et al., "System and Transports Interface of SVC", *IEEE Transactions Circuits and Systems for Video Technology*, 17(9):1149-1163, (2007).
ITU-T Recommendation H.264 (564 pages) (Nov. 2007).
Amon et al., "High-Level Syntax for SVC", Joint Video Team (JVT) of ISO/IEC MPEG & ITU-T VCEG, (ISO/IEC JTC1/SC29/WG11 and ITU-T SG 16 Q.6) $16^{th}$ Meeting: Poznan, PL, Jul. 24-29, 2005 (JVT-P100) (7 pages).
Doug Young Suh, "A shortened NAL Header for Light Applications", Joint Video Team (JVT) of ISO/IEC MPEG & ITU-T VCEG (ISO/IEC JTC1/SC29/WG11 and ITU-T SG16 Q.6) $22^{nd}$ Meeting: Marrakech, Morocco, Jan. 13-19, 2007, (JVT-V129) (5 pages).
Pandit et al., "H.264/AVC Extension for MVC Using SEI Message", Joint Video Team (JVT) of ISO/IEC MPEG & ITU-T VCEG (ISO/IEC JTC1/SC29/WG11 and ITU-T SG16 Q.6) $24^{th}$ Meeting: Geneva, Switerzland, Jun. 29-Jul. 6, 2007, (JVT-X061) (11 pages).
Wang et al., "SVC Corrigendum Items", Joint Video Team (JVT) of ISO/IEC MPEG & ITU-T VCEG (ISO/IEC JTC1/SC29/WG11 and ITU-T SG16 Q.6) $26^{th}$ Meeting: Antalya, TR, Jan. 13-18, 2008, (JVT-Z025) (2 pages).
Boyce et al., "Extensible High Layer Syntax for Scalability", Joint Collborative Team on Video Coding(JCT-VC) of ITU-T SG16 WP3 and ISO/IEC JTC1/SC29/WG11; $5^{th}$ Meeting: Geneva, CH, Mar. 16-23, 2011 (JCTVC-E279) (10 pages).
Schwarz et al., "Overview of the Scalable Extension of the H.264/MPEG-4 AVC Video Coding Standard", JVT Meeting; 78. MPEG Meeting; Oct. 20-27, 2006; (Joint Video Team of ISO/IEC JTC1/SC29/WG11 and ITU-T SG16) No. JVT-U145 (20 pages).
European Extended Search Report for EP Application No. 12754488, dated Sep. 2, 2014.
U.S. Appl. No. 13/621,714, filed Feb. 26, 2015 Non-Final Office Action.
U.S. Appl. No. 13/621,714, filed Aug. 26, 2015 Response to Non-Final Office Action.
U.S. Appl. No. 13/621,714, filed Sep. 29, 2015 Final Office Action.
U.S. Appl. No. 13/528,010, filed Feb. 27, 2015 Non-Final Office Action.
AU Examiner Report dated Aug. 25, 2015 in Patent Application No. 2012225513.

* cited by examiner

HYBRID VIDEO CODING TECHNIQUES

CROSS-REFERENCE TO RELATED APPLICATIONS

This application is a continuation-in-part of U.S. patent application Ser. No. 13/528,010, entitled "Scalable Coding Video Using Multiple Coding Technologies," filed Jun. 20, 2012; and a continuation-in-part of U.S. patent application Ser. No. 13/539,900, entitled "Dependency Parameter Set for Scalable Video Coding," filed Jul. 2, 2012. This application also claims priority to U.S. Provisional Application Serial No. 61/708,341, filed Oct. 1, 2012, which is hereby incorporated by reference in its entirety.

FIELD

The disclosed subject matter relates to techniques for encoding and decoding layered video where the non-temporal enhancement layers and their respective temporal enhancement layers use a scalable video coding technique, and the base layer and its respective temporal enhancement layers does not comply with the same scalable video coding technique.

BACKGROUND

Subject matter related to the present application can be found in co-pending U.S. patent application Ser. No. 13/528,010, entitled "Scalable Coding Video Using Multiple Coding Technologies"; co-pending U.S. patent application Ser. No. 13/529,159, entitled "Scalable Video Coding Techniques"; and Ser. No. 13/414,075, entitled "Dependency Parameter Set for Scalable Video Coding", all of which are incorporated herein by reference in their entireties.

Video compression using scalable techniques can allow a digital video signal to be represented in the form of multiple layers. Scalable video coding techniques have been standardized, including, temporal, spatial, and quality (SNR) scalability. Spatial and SNR scalability can be closely related in the sense that SNR scalability, at least in some implementations and for some video compression schemes and standards, can be viewed as spatial scalability with an spatial scaling factor of 1 in both X and Y dimensions, whereas spatial scalability can enhance the picture size of a base layer to a larger format by, for example, factors of 1.5 to 2.0 in each dimension. Due to this close relation, described henceforth is only spatial scalability.

ITU-T Rec. H.264 version 2 (2005) and later (available from International Telecommunication Union (ITU), Place des Nations, 1211 Geneva 20, Switzerland, and incorporated herein by reference in its entirety), and their respective ISO-IEC counterpart ISO/IEC 14496 Part 10 includes scalability mechanisms known as Scalable Video Coding or SVC, in their Annex G. All or substantially all features of temporal scalability are supported by various versions of H.264, whereas spatial or SNR scalability are specified in the SVC extension.

High Efficiency Video Coding (HEVC), specified in ITU-T Rec. H.265, available from the ITU) and incorporated herein by reference in its entirety, in its first version, also includes support for temporal scalability, whereas it lacks support for spatial or SNR scalability.

The specifications of spatial scalability in all aforementioned standards can vary, for example, due to different terminology, different coding tools of the non-scalable specification basis and/or different tools used for implementing scalability. However, one exemplary implementation strategy for a scalable encoder, configured to encode a base layer and one spatial or SNR enhancement layer, includes two encoding loops: one for the base layer, the other for the enhancement layer. Additional enhancement layers can be added by adding more coding loops. Conversely, a scalable decoder can be implemented by a base decoder and one or more enhancement decoder(s). This has been discussed, for example, in Dugad, R, and Ahuja, N, "A Scheme for Spatial Scalability Using Nonscalable Encoders", IEEE CSVT, Vol 13 No. 10, Oct. 2003, which is incorporated by reference herein in its entirety.

FIG. 1 illustrates a block diagram of such a prior art scalable encoder. It includes a video signal input (101), a downsample unit (102), a base layer coding loop (103), a base layer reference picture buffer (104), which can be part of the base layer coding loop but can also serve as an input to a reference picture upsample unit (105), an enhancement layer coding loop (106), and a bitstream generator (107).

The video signal input (101) can receive the to-be-coded video in any suitable digital format, for example according to ITU-R Rec. BT.601, March 1982 (available from International Telecommunication Union (ITU), Place des Nations, 1211 Geneva 20, Switzerland, and incorporated herein by reference in its entirety). The term "receive" can involve pre-processing actions such as filtering, resampling to, for example, the intended enhancement layer spatial resolution, and other operations. The spatial picture size of the input signal can be assumed to be the same as the spatial picture size of the enhancement layer. The input signal can be used in unmodified form (108) in the enhancement layer coding loop (106), which is coupled to the video signal input.

The video signal input can also be coupled to a downsample unit (102). A purpose of the downsample unit (102) is to down-sample the pictures received by the video signal input (101) in enhancement layer resolution, to a base layer resolution. The downsample factor can be, for example, 1.0, in which case the spatial dimensions of the base layer pictures are the same as the spatial dimensions of the enhancement layer pictures, resulting in a quality scalability, also known as SNR scalability. In this case, the operation of the downsample unit (102) can be a forwarding of the samples without modification. Downsample factors larger than 1.0 lead to base layer spatial resolutions lower than the enhancement layer resolution, which enables spatial scalability. Various downsample filters useful for different downsample factors are known to those skilled in the art.

Video coding standards as well as application constraints can set constraints for the base layer resolution in relation to the enhancement layer resolution. The scalable baseline profile of H.264/SVC, for example, allows downsample ratios of 1.5 or 2.0 in both X and Y dimensions. A downsample ratio of 2.0 means that the downsampled picture includes only one quarter of the samples of the non-downsampled picture. In the aforementioned video coding standards, the details of the downsampling mechanism can be chosen freely, independently of the upsampling mechanism. In contrast, the aforementioned video coding standards can specify the filter used for up-sampling, so to avoid drift in the enhancement layer coding loop (106).

The output of the downsampling unit (102) can be a downsampled version of the picture as produced by the video signal input (109). The base layer coding loop (103) can take the downsampled picture (109) produced by the downsample unit (102), and encode it into a base layer bitstream (110).

Certain video compression technologies rely, among others, on inter picture prediction techniques to achieve high compression efficiency. Inter picture prediction allows for the use of information related to one or more previously decoded or otherwise processed pictures, known as reference pictures, in the decoding of the current picture. Examples for inter picture prediction mechanisms include motion compensation, where during reconstruction blocks of pixels from a previously decoded picture are copied or otherwise employed after being moved according to a motion vector, or residual coding, where, instead of decoding pixel values, the potentially quantized difference between a pixel (including in some cases motion compensated pixel) of a reference picture and the reconstructed pixel value is contained in the bitstream and used for reconstruction. Inter picture prediction is a technology that can enable coding efficiency in modern video coding.

Conversely, an encoder can also create reference picture(s) in its coding loop. While in non-scalable coding, the use of reference pictures can have relevance in inter picture prediction, in case of scalable coding, reference pictures can also be relevant for cross-layer prediction. Cross-layer prediction can involve the use of a base layer's reconstructed picture, as well as other base layer reference picture(s) as a reference picture in the prediction of an enhancement layer picture. This reconstructed picture or reference picture can be the same as the reference picture(s) used for inter picture prediction. However, the generation of such a base layer reference picture can be required even if the base layer is coded in a manner, such as intra picture only coding, that would, without the use of scalable coding, not require a reference picture.

While base layer reference pictures can be used in the enhancement layer coding loop, FIG. 1 depicts the use of the reconstructed picture (i.e., the most recent reference picture) (111) for use by the enhancement layer coding loop. The base layer coding loop (103) can generate reference picture(s) in the aforementioned sense, and store it in the reference picture buffer (104).

The picture(s) stored in the reconstructed picture buffer (111) can be upsampled by the upsample unit (105) into the resolution used by the enhancement layer coding loop (106). The enhancement layer coding loop (106) can use the upsampled base layer reference picture as produced by the upsample unit (105) in conjunction with the input picture coming from the video input (101), and reference pictures (112) created by the enhancement layer coding loop in its coding process. The nature of these uses depends on the video coding standard, and has already been briefly introduced for some video compression standards above. The enhancement layer coding loop (106) can create an enhancement layer bitstream (113), which can be processed together with the base layer bitstream (110) and control information (not shown in FIG. 1) so as to create a scalable bitstream (114).

U.S. patent application Ser. No. 13/529,159, entitled "Scalable Video Coding Technique", and incorporated herein by reference in its entirety, discloses scalable video coding techniques suitable for HEVC and other basing video coding technologies, including multi-standard video coding. Multi-standard video coding, as outlined, for example in U.S. patent application Ser. No. 13/528,010 can refer to mechanisms that allow a base layer bitstream (110) to be of a different coding technique than the enhancement layer(s) bitstream(s) (113). As an example, throughout this specification, it is assumed that the base layer bitstream (110) (including its temporal enhancement layers, if any) conforms to H.264, whereas the at least one enhancement layer(s) bitstreams (113) including their respective temporal enhancement layers conform to a future extension of HEVC that can be based on techniques disclosed in aforementioned patent applications.

Accordingly, the base layer coding loop (103) that creates an H.264 compliant bitstream (110) uses a coding technology different than the enhancement layer coding loop (106), which creates HEVC scalable extension compliant enhancement layer bitstream(s) (113).

SUMMARY

The disclosed subject matter provides techniques for encoding and decoding layered video where the non-temporal enhancement layers and their respective temporal enhancement layers, comply with a scalable video coding standard or technology, and the base layer and its respective temporal enhancement layers does not comply with the same scalable video coding standard or technology. In one embodiment, an indication in a high level syntax structure tying together layers, such as a dependency parameter set or video parameter set, is used to indicate the standard(s) or technology(s) used for base and/or enhancement layer coding. In the same or another embodiment, in order to allow for the creation of a single scalable bitstream that includes syntax according to more than one coding technology, an encapsulation mechanism can be provided which allows the inclusion of syntax of one coding technology into the syntax of another coding technology. In the same or another embodiment, for such cases where different base and non-temporal enhancement layer coding technologies are in use and where both base and enhancement layer coding technologies support temporal scalability, a mechanism is disclosed that can be used to indicate the temporal id of the encapsulating NAL unit based on information that can be available in the encapsulated NAL units.

BRIEF DESCRIPTION OF THE DRAWINGS

Further features, the nature, and various advantages of the disclosed subject matter will be more apparent from the following detailed description and the accompanying drawings in which.

Figure 1:
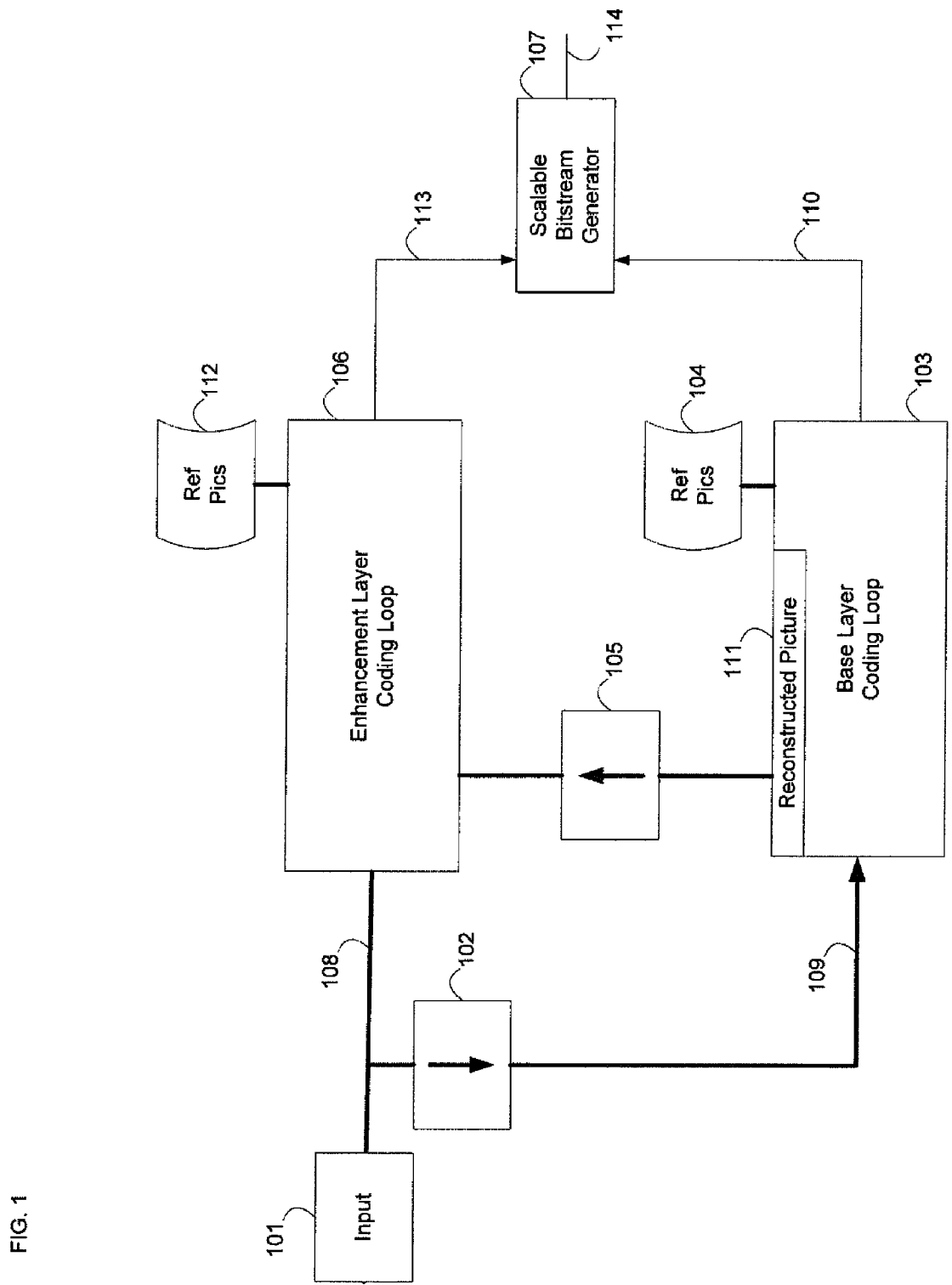
FIG. 1 is a schematic illustration of an exemplary scalable video encoder in accordance with the prior art.

The Figures are incorporated and constitute part of this disclosure. Throughout the Figures the same reference numerals and characters, unless otherwise stated, are used to denote like features, elements, components or portions of the illustrated embodiments. Moreover, while the disclosed subject matter will now be described in detail with reference to the Figures, it is done so in connection with the illustrative embodiments.

DETAILED DESCRIPTION

The disclosed subject matter relates to techniques to improve multistandard scalable encoding/decoding as disclosed in co-pending U.S. patent application Ser. Nos. 13/529,159, 13/414,075, and 13/528,010.

Figure 2:
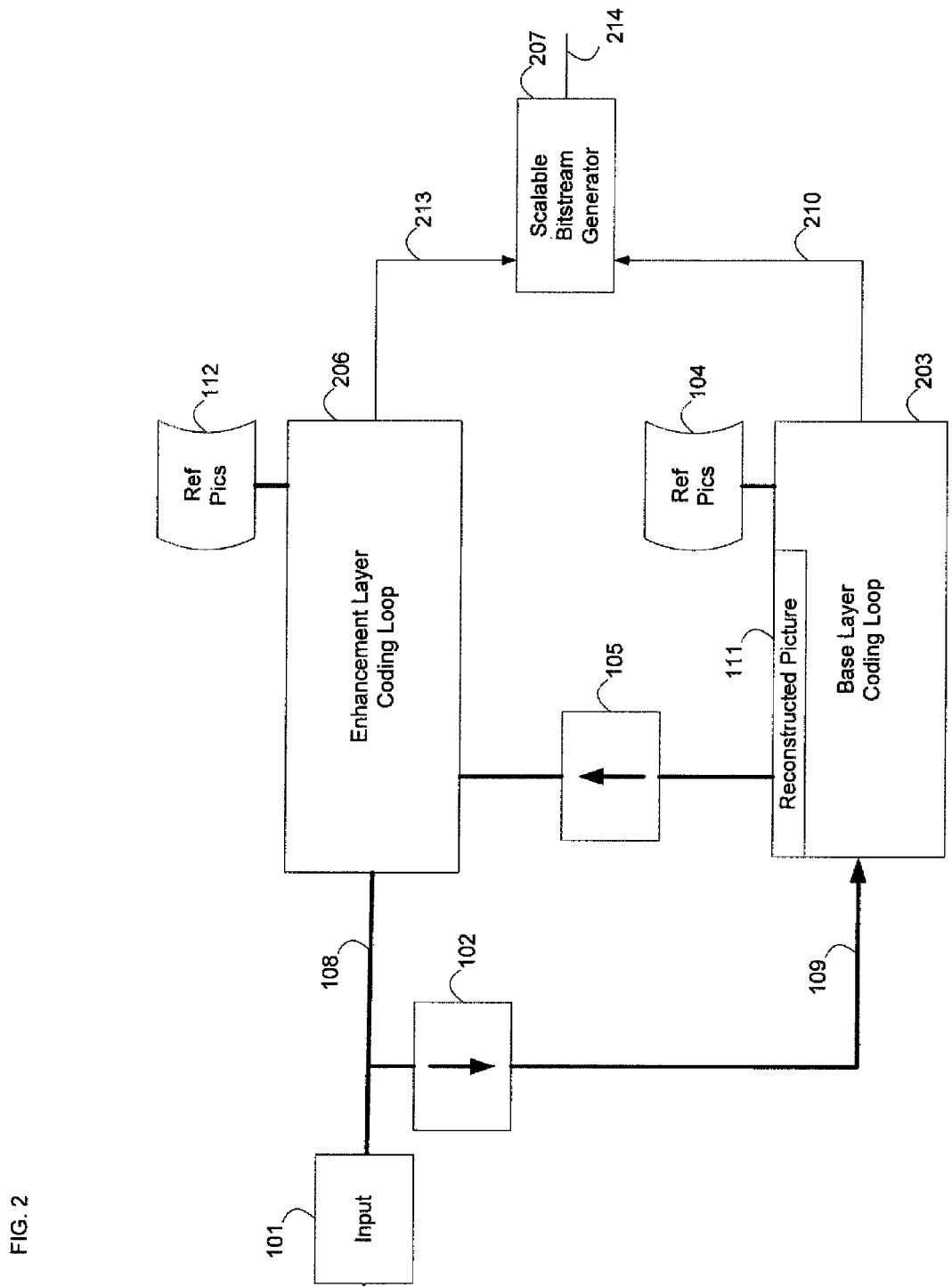
FIG. 2 is a schematic illustration of an exemplary scalable video encoder in accordance with the disclosed subject matter

Referring to FIG. 2, the generation of the scalable bitstream (214) from the, for example, H.264 compliant base layer bitstream (210) and the, for example, HEVC compliant enhancement layer bitstream(s) (213), created by the enhancement layer coding loop (206), in the scalable bitstream generator (207) will now be described. Disclosed herein are three exemplary aspects of this generation mechanism and of the resulting scalable bitstream (214):

(1): Signalling mechanisms to indicate the nature of the scalable bitstream (214) as being a hybrid of an, for example, H.264 base layer (103) and HEVC enhancement layer(s) (213) bitstreams;

(2): Encapsulation of the H.264 syntax of the base layer bitstream (210) into the HEVC compliant scalable bitstream (214); and (3): The support of temporal scalability, and especially the temporal scalability fields of the NAL unit header of the scalable bitstream (214).

Figure 3:
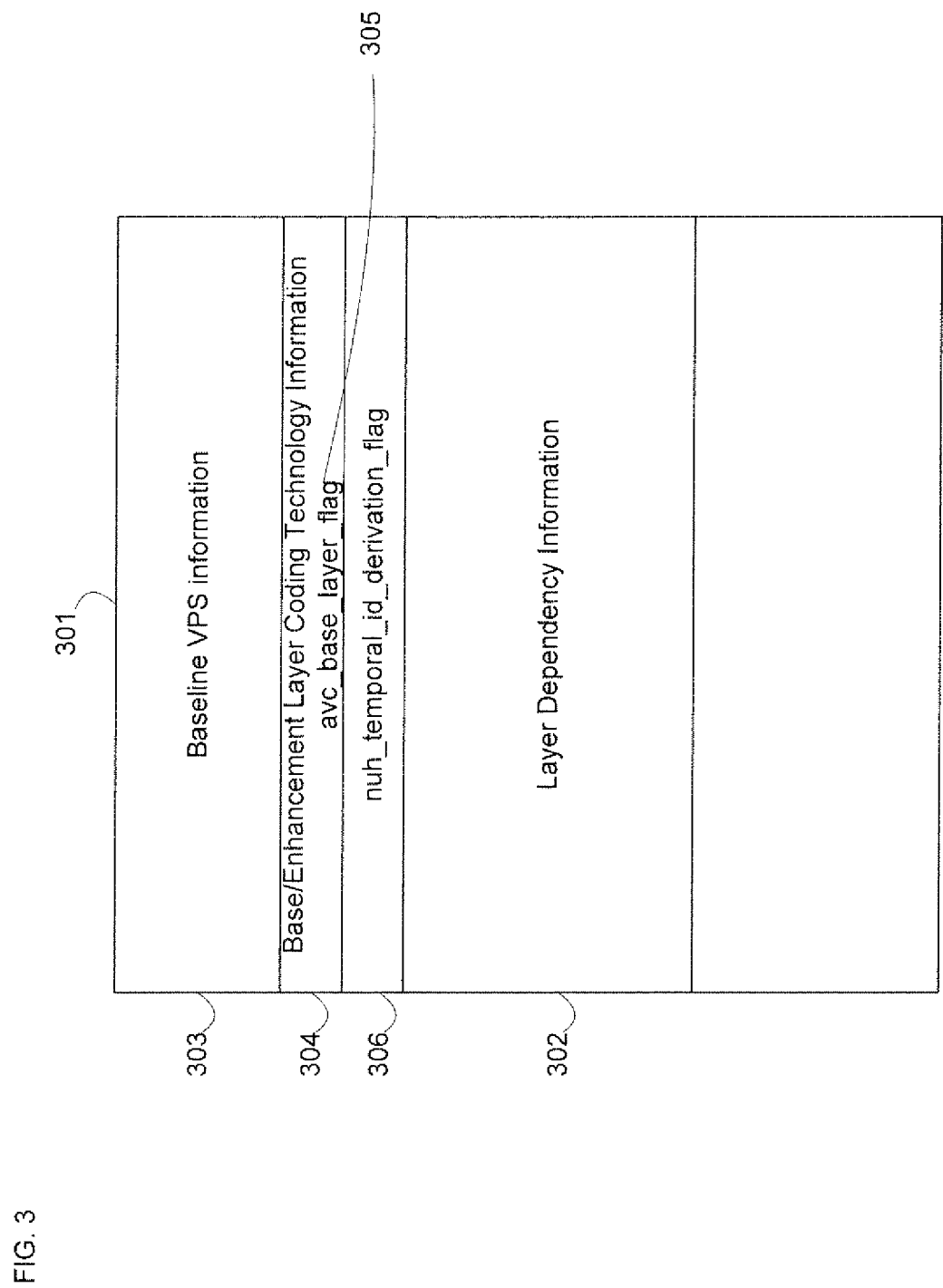
FIG. 3 is a schematic illustration of an exemplary video parameter set in accordance with an embodiment of the disclosed subject matter.

In an embodiment, as shown in FIG. 3, a parameter set (such as a dependency parameter set or a video parameter set) or other high level syntax structure (such as a sequence header or a scalability information SEI message) (301) that, among other things, tie together layers using, for example, layer dependency information (302) can include information pertaining to the video coding technology in use. Technologies that tie together layers (302) in a parameter set have been disclosed, for example, in U.S. patent application Ser. No. 13/414,075, entitled "Dependency Parameter Set for Scalable Video Coding", which is incorporated herein by reference in its entirety. HEVC's video parameter set can also contains other information, denoted here as baseline information (303).

As an example, the SNR and/or spatial enhancement layers and their respective temporal enhancement layers can be coded in accordance with an extension of HEVC that includes a video parameter set (301), which in turn can include functionalities of the dependency parameter set (302) as described in U.S. Pat. No. 13/414,075. In this example, the base layer, and its respective temporal enhancement layers can be coded in accordance with H.264. According to an embodiment, the video parameter set can include information (304) of the video coding technology used to encode base layer and/or non-temporal enhancement layer(s). There are different options for representing this information. For example, a registry can be set up that includes codewords for base layer and/or enhancement layer technologies, and a corresponding codeword can be placed into the description of the base layer and each enhancement layer, or (assuming that all enhancement layers are using the same coding technology), once for all enhancement layers together.

Shown in FIG. 3 is an approach that satisfies some use cases that are discussed in JCT-VC, e.g., an H.264 (AVC or SVC with only temporal enhancement layers) base layer, and an HEVC enhancement layer. One coding mechanism addressing this use case in the context of an HEVC scalable extension, which implies that non-temporal enhancement layers are coded in HEVC-style, whereas the base layer can either be coded in H.264 or in HEVC. In this scenario, a single flag, the avc_base_layer_flag (305) can indicate, for example to a decoder, that the base layer bitstream (210) (and its temporal enhancement layers, if any) are coded in H.264 syntax, whereas the non-temporal enhancement layers (213) and their respective temporal enhancement layers are coded in HEVC syntax.

HEVC and H.264 specify a different high level syntax, and different NAL unit headers. In order to include both H.264 and HEVC NAL units in a single, scalable HEVC bitstream, it may be necessary to encapsulate the H.264 NAL units into HEVC NAL units. Techniques for such an encapsulation have been disclosed, for example, in JCT-VC contribution JCTVC-F290 (Hong, D., et. al, "Scalability Support in HEVC", Jul. 1, 2011, available from http://phenix.int-evry.fr/jct/doc_end_user/current_document.php?id=2756), which is incorporated herein by reference in its entirety.

Figure 4:
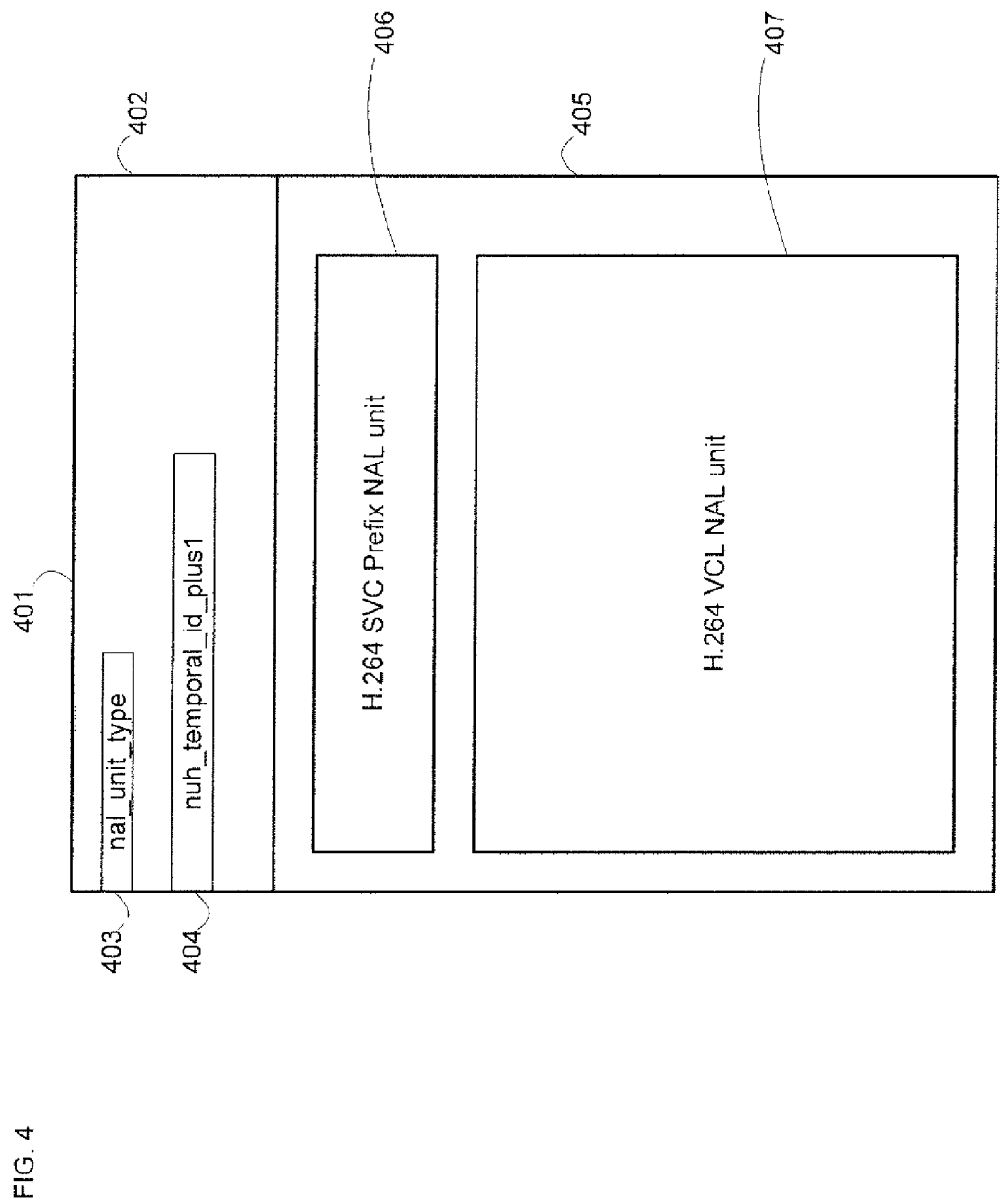
FIG. 4 is a schematic illustration of an exemplary encapsulation NAL unit in accordance with an embodiment of the disclosed subject matter.

FIG. 4 shows one exemplary encapsulation NAL unit. An HEVC NAL unit (401) can contain a header (402) including, among other fields, a nal_unit_type (403) and a nuh_temporal_id_plus1 (404). The nal_unit_type field (403) can indicate through the use of a standardized value that the NAL unit is an encapsulation NAL unit. An example use of the nuh_temporal_id_plus1 (404) is disclosed below.

The payload (405) of the HEVC NAL unit (401) (which can be all parts of the NAL unit (401) except for the header (402) can include one or more H.264 NAL units; shown are two (406) (407). In the same or another embodiment, the payload can include a prefix NAL unit (406) as specified in H.264/SVC or H.264/MVC, and a VCL NAL unit (407) as specified in H.264, with or without the SVC or MVC extension. Depending on the encoder, and its capability of encoding SVC or MVC, the prefix NAL unit may or may not be present.

In HEVC, even without its scalable extension, the nuh_temporal_id_plus1 field (404) in its NAL unit header (402) can indicate a temporal level for the decoding of which the content of the NAL unit is required. Lower values for nuh_temporal_id_plus1 can indicate a lower temporal layer. Under certain circumstances, all lower temporal layers can be required to decode a higher temporal layer. A value of nuh_temporal_id_plus1 of 1 can indicate the temporal base layer.

An H.264 encoder has flexibility in the use of the reference picture list construction and management, which complicates temporal layering. The NAL unit header of H.264 NAL units (407) without the SVC or MVC extensions do not include a temporal ID field. In order to cure that deficit, during the design of SVC, a temporal ID field was introduced for the SVC compliant NAL units, and a so-called prefix NAL unit was introduced that a legacy H.264 decoder could discard, but a more modern decoder or MANE can use to derive, among other things, the temporal layer of the NAL unit immediately following the prefix NAL unit. The use of different temporal ID values in the NAL unit header in the SVC or MVC extensions implies restrictions on the flexibility of the encoder's reference picture list construction and management, so that higher temporal layers can be removed from the bitstream without impacting the decoding of lower temporal layers.

Two exemplary options for the use of nuh_temporal_id_plus1 (404) are described below. The choice between the two options can be made by standardization (i.e. the HEVC extension specification could specify and use only one of the options), or could be dependent on a codepoint, for example a nuh_temporal_id_derivation_flag (306) that can be located, for example, in the video parameter set (301) or a similar high level syntax structure that pertains to multiple layers. The presence of the nuh_temporal_id_derivation_flag can be conditioned on the avc_base_layer_flag being set, or other information indicating hybrid layered coding.

In the first option, according to the same or another embodiment, the value of nuh_temporal_id_plus1 (404) can be set to the value of temporal_id+1 in the prefix NAL unit, if such a prefix NAL unit is present in the payload of the HEVC NAL unit. If a prefix NAL unit is not present, and the H.264 NAL unit is an SVC NAL unit, then the value of nuh_temporal_id_plus 1 can be set to (by, for example, the enhancement layer coding loop of the encoder (206)), and can be restricted to (by, for example, the bitstream conformance), the value of temporal_id+1 of the SVC NAL unit header. If the prefix NAL unit is not included and the H.264 NAL unit is a legacy H.264 NAL unit (not containing a temporal ID) then the value of nuh_temporal_id_plus1 (404) can be set to, and restricted to a value of 1, indicating the temporal base layer.

A second option requires encoder cooperation with respect to the coding options chosen by the base layer coding loop (203) and may, at least in some cases, not be implemented in scenarios where an already pre-encoded (H.264) base layer is augmented with HEVC. At least some H.264 encoders use a strict temporal layering structure as part of their coding algorithm, even if they lack the syntax to express such a restriction in the bitstream. However, if the H.264 encoder that is part of a multistandard H.264/HEVC layered encoder (that uses HEVC NAL unit encapsulation as described above) uses temporal layering, it can use the nuh_temporal_id_plus1 (404) field to express the temporal layering of the encapsulated H.264 NAL units even if the H.264 syntax does not include mechanisms to express such a relationship. This allows the temporal layering structure to be aligned between the base and the enhancement layer.

The first option works with all H.264 bitstreams, even with those not observing any temporal layering. Further, the encapsulation can be applied even without the cooperation of the H.264 encoder. However, it may not allow a MANE or decoder to prune NAL units of temporal enhancement layers of the base layer.

The second option requires encoder cooperation, but allows a MANE or decoder to prune NAL units of a temporal enhancement layer not needed for decoding.

Figure 5:
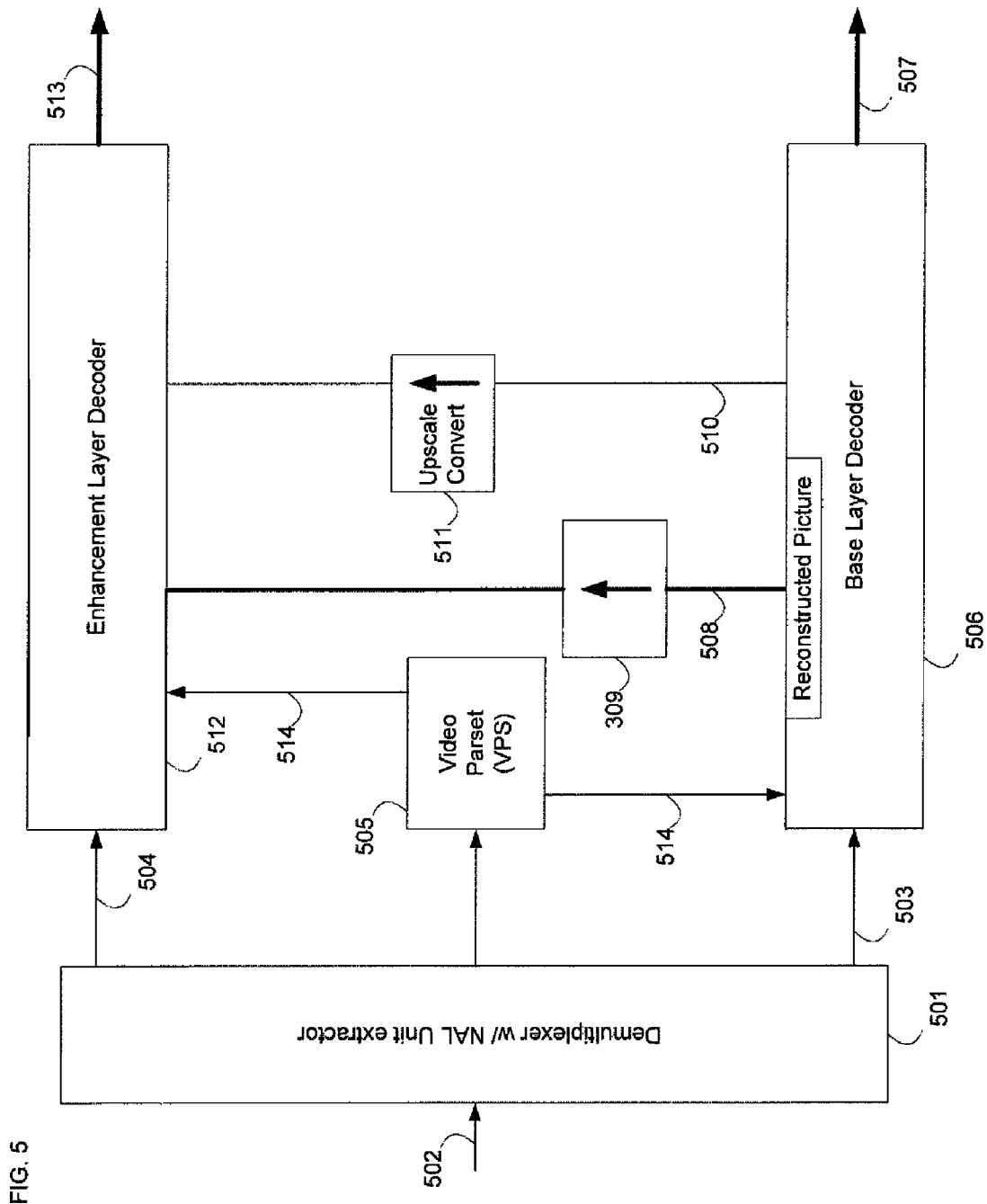
FIG. 5 is a schematic illustration of an exemplary decoder in accordance with the disclosed subject matter.

FIG. 5 shows a decoder according to an embodiment of the disclosed subject matter. A demultiplexer (501) can split a received scalable bitstream (502) into, for example, a base layer bitstream (503) and an enhancement layer bitstream (504). The demultiplexer (501) can include a NAL unit extractor that extracts base layer NAL units (for example H.264 NAL units) that make up the base layer bitstream (503) from the NAL units that form the scalable bitstream (501), which can be in HEVC syntax. The reverse mechanism of the encapsulation, as already described, can apply. Further, the demultiplexer can recreate, from the scalable bitstream or out-of-band information, a video parameter set (505) that can contain the same information as the video parameter set generated by the encoder. It can therefore contain information pertaining to the layering structure of the scalable bitstream and, according to the same or another embodiment, can also include, for at least one layer, an indication of the coding mechanism used to decode the bitstream of the layer in question: for example an avc_base_layer_flag and/or a nuh_temporal_id_derivation_flag. This information can, for example, be used in the reverse fashion as used in the encoder, which has already been described.

A base layer decoder (506) can create a reconstructed picture sequence that can be output (507) if so desired by the system design. Parts or all of the reconstructed picture sequence (508) can also be used by cross-layer prediction after being upsampled in an upsample unit (509). Similarly, side information (510) can be created during the decoding process and can be upscaled by an upscale unit (511). Upscale unit and upsample unit have already been described in the context of the encoder, and should operate such that, for a given input, the output is substantially similar to the output of the encoder's upsample/upscale units so to avoid drift between encoder and decoder. This can be achieved by standardizing the upsample/upscale mechanisms, and requiring conformance of the upsample/upscale units of both encoder and decoder with the standard.

When decoding an enhancement layer picture, the decoded base layer picture corresponding to the same picture output time should be available to the enhancement layer decoder. This can be achieved by aligning the picture coding order of corresponding pictures in the base layer and the enhancement layer and arranging the base layer coded picture immediately preceding its corresponding enhancement layer coded picture in the coded bitstream.

The enhancement layer decoder (512) can create enhancement layer pictures (513) that can be output for use by the application.

Computer System

The methods for hybrid video coding, described above, can be implemented as computer software using computer-readable instructions and physically stored in computer-readable medium. The computer software can be encoded using any suitable computer languages. The software instructions can be executed on various types of computers. For example, FIG. 6 illustrates a computer system 600 suitable for implementing embodiments of the present disclosure.

Figure 6:
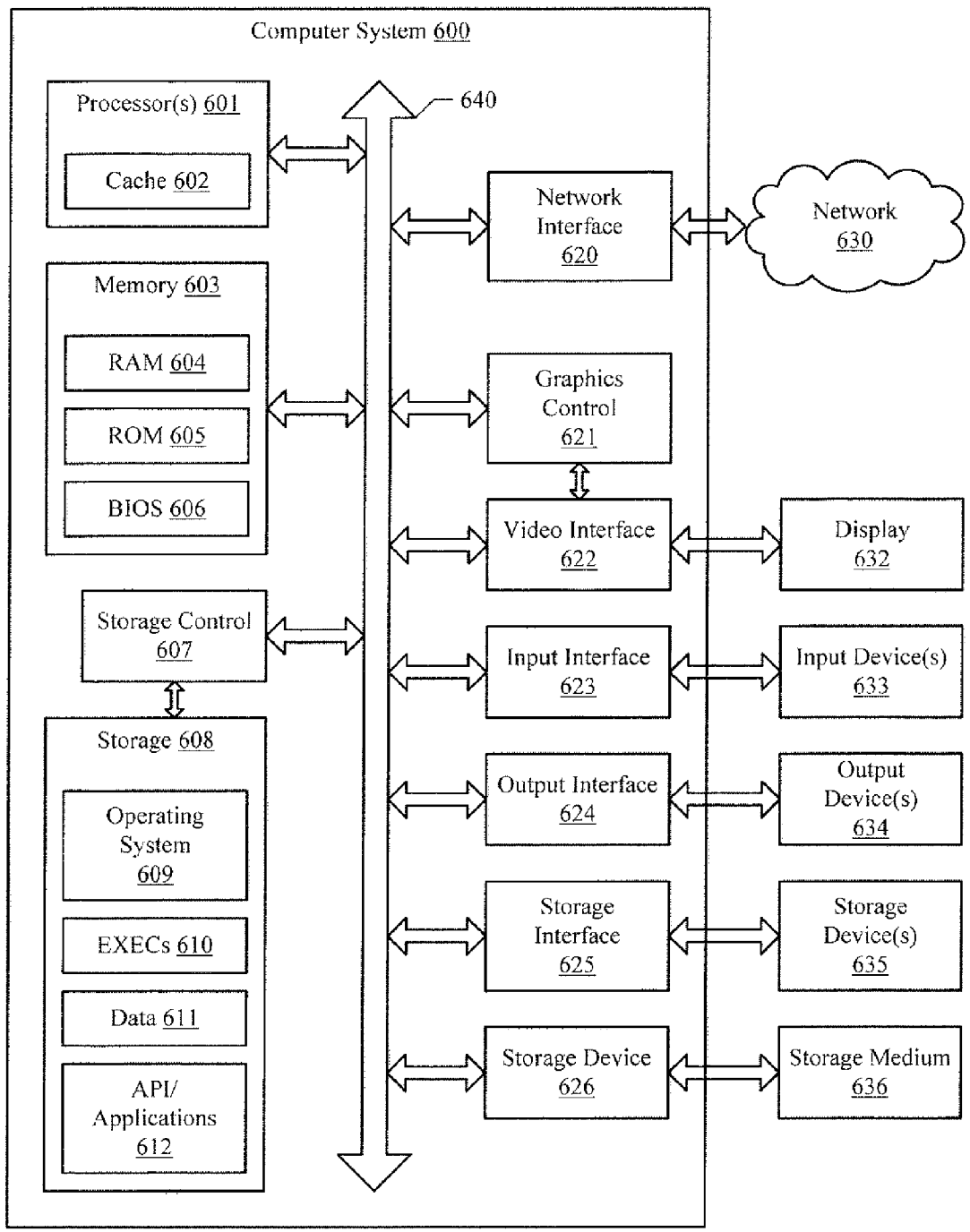
FIG. 6 shows an exemplary computer system in accordance with an embodiment of the disclosed subject matter.

The components shown in FIG. 6 for computer system 600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system. Computer system 400 can have many physical forms including an integrated circuit, a printed circuit board, a small handheld device (such as a mobile telephone or PDA), a personal computer or a super computer.

Computer system 600 includes a display 632, one or more input devices 633 (e.g., keypad, keyboard, mouse, stylus, etc.), one or more output devices 634 (e.g., speaker), one or more storage devices 635, various types of storage medium 636.

The system bus 640 link a wide variety of subsystems. As understood by those skilled in the art, a "bus" refers to a plurality of digital signal lines serving a common function. The system bus 640 can be any of several types of bus structures including a memory bus, a peripheral bus, and a local bus using any of a variety of bus architectures. By way of example and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 601 (also referred to as central processing units, or CPUs) optionally contain a cache memory unit 602 for temporary local storage of instructions, data, or computer addresses. Processor(s) 601 are coupled to storage devices including memory 603. Memory 603 includes random access memory (RAM) 604 and read-only memory (ROM) 605. As is well known in the art, ROM 605 acts to transfer data and instructions uni-directionally to the processor(s) 601, and RAM 604 is used typically to transfer data and instructions in a bi-directional manner. Both of these types of memories can include any suitable of the computer-readable media described below.

A fixed storage 608 is also coupled bi-directionally to the processor(s) 601, optionally via a storage control unit 607. It provides additional data storage capacity and can also include any of the computer-readable media described below. Storage 608 can be used to store operating system 609, EXECs 610, application programs 612, data 611 and the like and is typically a secondary storage medium (such as a hard disk) that is slower than primary storage. It should be appreciated that the information retained within storage 608, can, in appropriate cases, be incorporated in standard fashion as virtual memory in memory 603.

Processor(s) 601 is also coupled to a variety of interfaces such as graphics control 621, video interface 622, input interface 623, output interface 624, storage interface 625, and these interfaces in turn are coupled to the appropriate devices. In general, an input/output device can be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 601 can be coupled to another computer or telecommunications network 630 using network interface 620. With such a network interface 620, it is contemplated that the CPU 601 might receive information from the network 630, or might output information to the network in the course of performing the above-described method. Furthermore, method embodiments of the present disclosure can execute solely upon CPU 601 or can execute over a network 630 such as the Internet in conjunction with a remote CPU 601 that shares a portion of the processing.

According to various embodiments, when in a network environment, i.e., when computer system 600 is connected to network 630, computer system 600 can communicate with other devices that are also connected to network 630. Communications can be sent to and from computer system 600 via network interface 620. For example, incoming communications, such as a request or a response from another device, in the form of one or more packets, can be received from network 630 at network interface 620 and stored in selected sections in memory 603 for processing. Outgoing communications, such as a request or a response to another device, again in the form of one or more packets, can also be stored in selected sections in memory 603 and sent out to network 630 at network interface 620. Processor(s) 601 can access these communication packets stored in memory 603 for processing.

In addition, embodiments of the present disclosure further relate to computer storage products with a computer-readable medium that have computer code thereon for performing various computer-implemented operations. The media and computer code can be those specially designed and constructed for the purposes of the present disclosure, or they can be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Those skilled in the art should also understand that term "computer readable media" as used in connection with the presently disclosed subject matter does not encompass transmission media, carrier waves, or other transitory signals.

As an example and not by way of limitation, the computer system having architecture 600 can provide functionality as a result of processor(s) 601 executing software embodied in one or more tangible, computer-readable media, such as memory 603. The software implementing various embodiments of the present disclosure can be stored in memory 603 and executed by processor(s) 601. A computer-readable medium can include one or more memory devices, according to particular needs. Memory 603 can read the software from one or more other computer-readable media, such as mass storage device(s) 635 or from one or more other sources via communication interface. The software can cause processor(s) 601 to execute particular processes or particular parts of particular processes described herein, including defining data structures stored in memory 603 and modifying such data structures according to the processes defined by the software. In addition or as an alternative, the computer system can provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for decoding a base layer conforming to a second coding technology from a hybrid scalable bitstream, the hybrid scalable bitstream comprising the base layer conforming to the second coding technology and at least one enhancement layer conforming to a first coding technology, wherein the first and second coding technology are not the same, and wherein both first and second coding technologies use Network Abstraction Layer (NAL) units, the method comprising:

extracting at least one second NAL unit conforming to the second coding technology from a first NAL unit of the hybrid bitstream identified by a pre-determined value of a nal_unit_type indicating the NAL unit is an encapsulation NAL unit, and decoding, in a decoding device compliant with the second coding technology, the at least one second NAL unit, wherein the second coding technology is identified by a syntax element in a Video Parameter Set (VPS); and wherein both the first and second coding technology support temporal layers, and the VPS further includes information indicative of a derivation of the temporal layer associated with the second NAL unit from the temporal layer associated with the first NAL unit.

2. The method of claim 1, wherein the information indicative of the derivation comprises: a flag nuh_temporal_id_derivation_flag indicative of one of: (1) no derivation, in which case the temporal layer of the second NAL unit is the temporal base layer; or (2) derivation, in which case the temporal layer of the second nal unit is equal to the temporal layer of the first NAL unit.

3. The method of claim 2, wherein the presence of the nuh_temporal_id_derivation_flag is conditioned on the value of the syntax element in the Video Parameter set identifying the second coding technology.

4. A method for encoding a base layer conforming to a second coding technology in a hybrid scalable bitstream, the hybrid scalable bitstream comprising the base layer conforming to the second coding technology and at least one enhancement layer conforming to a first coding technology, wherein the first and second coding technology are not the same, and wherein both first and second coding technologies use Network Abstraction Layer (NAL) units, the method comprising:
   encoding, in a base layer encoding device compliant with the second coding technology, the at least one second NAL unit, and
   encapsulating at least one second NAL unit conforming to the second coding technology into a first NAL unit of the hybrid bitstream identified by a pre-determined value of a nal_unit_type indicating the NAL unit is an encapsulation NAL unit,
   wherein the second coding technology is identified by a syntax element in a Video Parameter Set (VPS); and
   wherein both the first and second coding technology support temporal layers, and the VPS further includes information indicative of a derivation of the temporal layer associated with the second NAL unit from the temporal layer associated with the first NAL unit.

5. The method of claim 4, wherein the information indicative of the derivation comprises: a flag nuh_temporal_id_derivation_flag indicative of one of: (1) no derivation, in which case the temporal layer of the second NAL unit is the temporal base layer; or (2) derivation, in which case the temporal layer of the second nal unit is equal to the temporal layer of the first NAL unit.

6. The method of claim 5, wherein the presence of the nuh_temporal_id_derivation_flag is conditioned on the value of the syntax element in the Video Parameter set identifying the second coding technology.

7. A system for decoding a base layer conforming to a second coding technology from a hybrid scalable bitstream, the hybrid scalable bitstream comprising the base layer conforming to the second coding technology and at least one enhancement layer conforming to a first coding technology, wherein the first and second coding technology are not the same, and wherein both first and second coding technologies use Network Abstraction Layer (NAL) units, the system comprising:
   a decoding device, the decoding device being compliant with the second coding technology and being configured to:
   extract at least one second NAL unit conforming to the second coding technology from a first NAL unit of the hybrid bitstream identified by a pre-determined value of a nal_unit_type indicating the NAL unit is an encapsulation NAL unit, and
   decode the at least one second NAL unit,
   wherein the second coding technology is identified by a syntax element in a Video Parameter Set (VPS); and
   wherein both the first and second coding technology support temporal layers, and the VPS further includes information indicative of a derivation of the temporal layer associated with the second NAL unit from the temporal layer associated with the first NAL unit.

8. The system of claim 7, wherein the information indicative of the derivation comprises: a flag nuh_temporal_id_derivation_flag indicative of one of: (1) no derivation, in which case the temporal layer of the second NAL unit is the temporal base layer; or (2) derivation, in which case the temporal layer of the second nal unit is equal to the temporal layer of the first NAL unit.

9. The system of claim 8, wherein the presence of the nuh_temporal_id_derivation_flag is conditioned on the value of the syntax element in the Video Parameter set identifying the second coding technology.

10. A system for encoding a base layer conforming to a second coding technology in a hybrid scalable bitstream, the hybrid scalable bitstream comprising the base layer conforming to the second coding technology and at least one enhancement layer conforming to a first coding technology, wherein the first and second coding technology are not the same, and wherein both first and second coding technologies use Network Abstraction Layer (NAL) units, the system comprising:
   an encoding device, the encoding device being configured to:
   encode, in a base layer encoding device compliant with the second coding technology, the at least one second NAL unit, and
   encapsulate at least one second NAL unit conforming to the second coding technology into a first NAL unit of the hybrid bitstream identified by a pre-determined value of a nal_unit_type indicating the NAL unit is an encapsulation NAL unit,
   wherein the second coding technology is identified by a syntax element in a Video Parameter Set (VPS); and
   wherein both the first and second coding technology support temporal layers, and the VPS further includes information indicative of a derivation of the temporal layer associated with the second NAL unit from the temporal layer associated with the first NAL unit.

11. The system of claim 10, wherein the information indicative of the derivation comprises: a flag nuh_temporal_id_derivation_flag indicative of one of: (1) no derivation, in which case the temporal layer of the second NAL unit is the temporal base layer; or (2) derivation, in which case the temporal layer of the second nal unit is equal to the temporal layer of the first NAL unit.

12. The system of claim 11, wherein the presence of the nuh_temporal_id_derivation_flag is conditioned on the value of the syntax element in the Video Parameter set identifying the second coding technology.

13. A non-transitory computer readable medium comprising a set of executable instructions to direct a processor to perform the method in one of claims 1 to 6.

* * * * *